United States Patent
Okocha et al.

(10) Patent No.: US 10,633,573 B2
(45) Date of Patent: Apr. 28, 2020

(54) COMPOSITION AND METHOD FOR INHIBITION OF SULFIDE SCALES

(71) Applicant: Clariant International, Ltd., Muttenz (CH)

(72) Inventors: Cyril Emeka Okocha, The Woodlands, TX (US); Jonathan Wylde, The Woodlands, TX (US)

(73) Assignee: CLARIANT INTERNATIONAL LTD., Muttenz (CH)

(*) Notice: Subject to any disclaimer, the term of this patent is extended or adjusted under 35 U.S.C. 154(b) by 0 days.

(21) Appl. No.: 15/562,852

(22) PCT Filed: Mar. 1, 2016

(86) PCT No.: PCT/EP2016/054293
§ 371 (c)(1),
(2) Date: Sep. 28, 2017

(87) PCT Pub. No.: WO2016/155967
PCT Pub. Date: Oct. 6, 2016

(65) Prior Publication Data
US 2018/0105732 A1    Apr. 19, 2018

Related U.S. Application Data

(63) Continuation of application No. 14/677,500, filed on Apr. 2, 2015, now abandoned.

(30) Foreign Application Priority Data

Apr. 28, 2015 (EP) .................................. 15001250

(51) Int. Cl.
| | | |
|---|---|---|
| *C09K 8/532* | (2006.01) | |
| *C02F 5/10* | (2006.01) | |
| *C09K 8/528* | (2006.01) | |
| *C02F 5/14* | (2006.01) | |
| *C02F 5/12* | (2006.01) | |
| *C02F 101/10* | (2006.01) | |
| *C02F 103/10* | (2006.01) | |

(52) U.S. Cl.
CPC ............. *C09K 8/532* (2013.01); *C02F 5/10* (2013.01); *C02F 5/14* (2013.01); *C09K 8/528* (2013.01); *C02F 5/12* (2013.01); *C02F 2101/101* (2013.01); *C02F 2103/10* (2013.01); *C02F 2303/22* (2013.01); *C09K 2208/20* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 4,680,127 A | 7/1987 | Edmondson | |
| 4,762,626 A | 8/1988 | Emmons | |
| 4,778,813 A | 10/1988 | Fenyes | |
| 5,171,459 A | 12/1992 | Kaplan | |
| 5,332,491 A | 7/1994 | Fisher | |
| 6,784,168 B1 * | 8/2004 | Jones | ............ A01N 57/34 514/104 |
| 2003/0073586 A1 * | 4/2003 | Crossman | ............ C02F 5/04 507/227 |

(Continued)

FOREIGN PATENT DOCUMENTS

| | | |
|---|---|---|
| EP | 2650314 | 10/2013 |
| WO | 9933345 | 7/1999 |

(Continued)

OTHER PUBLICATIONS

Dow (pp. 1-2, accessed online Mar. 5, 2019). (Year: 2019).*

(Continued)

*Primary Examiner* — Clare M Perrin
(74) *Attorney, Agent, or Firm* — Tod A. Waldrop

(57) ABSTRACT

The present invention provides a composition useful as a sulfide scale inhibitor for application in oilfield operations, comprising 1) at least one copolymer that comprises as monomers
   a) 0.1 to 10 mol-%, of structural units derived from vinylphosphonic acid and/or of a salt thereof,
   b) 40 to 80 mol-% of structural units derived from compounds of the formula (1)

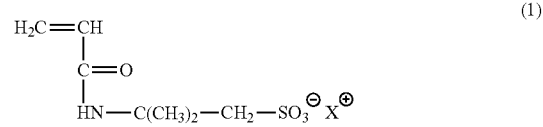

(1)

c) 1 to 50 mol-% of structural units derived from compounds of the formula (2)

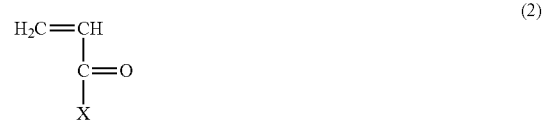

(2)

in which
X is OH or NR3R4, and R3 and R4, independently of one another, are H or $C_1$-$C_4$-alkyl, 2) at least one of tris (hydroxymethyl) phosphine or a tetrakis(hydroxymethyl)phosphonium salt,
3) at least one surfactant,
4) at least one amine or ammonium salt.

39 Claims, No Drawings

(56) References Cited

U.S. PATENT DOCUMENTS

| | | |
|---|---|---|
| 2005/0067164 A1 | 3/2005 | Ke |
| 2007/0125987 A1* | 6/2007 | Hills .......................... C02F 5/12 |
| | | 252/408.1 |
| 2009/0143252 A1 | 6/2009 | Lehmann |
| 2009/0186858 A1* | 7/2009 | Talbot .................... A01N 57/34 |
| | | 514/129 |
| 2012/0080232 A1* | 4/2012 | Muller ..................... C09K 8/36 |
| | | 175/57 |
| 2014/0057817 A1* | 2/2014 | Janak ..................... C10G 29/24 |
| | | 507/243 |
| 2014/0190870 A1 | 7/2014 | Lehrer |
| 2015/0166876 A1* | 6/2015 | Labarre ................ C08F 22/385 |
| | | 507/225 |

FOREIGN PATENT DOCUMENTS

| | | | |
|---|---|---|---|
| WO | 03021031 | 3/2003 | |
| WO | 2005026065 | 3/2005 | |
| WO | 2013152832 | 10/2013 | |
| WO | WO-2014016410 A1 * | 1/2014 | ............ C08F 22/385 |

OTHER PUBLICATIONS

International Preliminary Report on Patentability for PCT/EP2016/054293, dated . (6 pages).

International Search Report for PCT/EP2016/054293, dated May 12, 2016. (4 pages).

* cited by examiner

COMPOSITION AND METHOD FOR INHIBITION OF SULFIDE SCALES

The invention relates to a process for the inhibition and/or dispersion of inorganic sulfide scales by use of a synthetic copolymer as part of a synergistic formulation. The formulations containing the copolymer of the invention have particular applicability in inhibiting and/or dispersing zinc sulfide and/or lead sulfide and/or iron sulfide.

It has been well documented that sulfide scales of iron, zinc and lead can cause various challenges with process and production in the oil industry. Sulfide scale precipitation in the formation, around screens and perforations can decrease production capacity. The common metal sulfide minerals have been shown in Table 1, it is also possible for solid solutions to exist between the metal cations that counter the sulfide anion.

TABLE 1

The common sulfide minerals.

| Mineral Name | Chemical Formula |
| --- | --- |
| Pyrite | $FeS_2$ |
| Marcasite | $FeS_2$ |
| Pyrrhotite | $Fe_{1-x}S$ |
| Troilite | $FeS$ |
| Mackinawite | $FeS_{1-x}$ |
| Greigite | $Fe_3S_4$ |
| Kansite | $Fe_9S_8$ |
| Sphalerite | $ZnS$ |
| Galena | $PbS$ |

Accumulation of sulfide scale in the tubulars can result in reduced well deliverability. The build-up of sulfide scale interferes with the operation of pumps, valves and other associated surface equipment.

The surface of sulfide scales is oil-wet (oleophillic), in particular iron sulfide, and free-floating iron sulfide particles are often found at the oil-water interface and stabilize emulsions, thus affecting the separation process. Iron sulfide has also been reported as far downstream as the refinery, where it has reduced the efficacy of heat exchange surfaces. Deposition can also create an integrity risk; once sulfides form onto metal surfaces, they form a cathode to the equipment surface which yields a significant localized corrosion (pitting) potential. This is commonly exacerbated by the irregular form of the scale surfaces thus accelerating further corrosion.

Sulfide scale forms most typically as an $H_2S$ corrosion product or from the mixing of incompatible waters. The primary reaction at normal brine pH is:

$$M^{2+} + H_2S \text{ (aq)} \leftrightarrow MS \text{ (s)} + 2H^+$$

M=Fe, Pb or Zn

It has been postulated that iron sulfide scale is predominantly deposited as a result of microbially enhanced corrosion or as a result of the reduction of iron oxide (from corrosion) by hydrogen sulfide, derived from sulfate reducing bacteria (SRB) metabolism.

The presence of iron sulfide solids is common in aging assets, as the prevalence of corrosion products e.g. iron can occur as a result of insufficient corrosion protection. Iron, zinc and lead sulfide solids can also be found in the formation waters associated with certain reservoirs, where high pressure, high temperature and high salinity (HP/HT/HS) conditions are encountered.

Prevention of sulfide scales is challenging. Part of the reason for this is the extremely low solubility products ($K_{sp}$) associated with sulfide scales, due in part to the highly covalent nature of transition metals sulfides.

Existing methods of remediation available to treat sulfide scale deposits comprise both mechanical and chemical. Mechanical remediation by way of jetting is possible if the areas affected by mineral scale build up are readily accessible. Pipework with more tenacious deposits may require more aggressive milling operations to be undertaken. Both options incur costs in terms of deferred oil production and equipment rental.

The process and science behind control and prevention of iron sulfide is much more complex than removal and dissolution. All facets are more complex, whether it is laboratory testing, implementation in the field or the mechanism of inhibition. The control and preventions strategies can therefore involve a multi-faceted approach, combining:

Chelating agents (for iron sequestration)
Surfactants (for water wetting)
Biocide (to target SRB and biofilm)
Corrosion inhibitor (to lower total iron in system)
Sulfide scale inhibitors (threshold inhibition of scale)

The key to implementing an effective mitigation treatment is to first understand the root cause of the sulfide scale and where the source of metal ions and sulfide are coming from. Once this has been identified, then the appropriate mitigation can be put into place.

The patent landscape for chemical sulfide inhibition is relatively focused on a few chemistries.

U.S. Pat. No. 4,762,626 discloses the use of a hydroxethylacrylate/acrylic acid copolymer as a zinc sulfide scale inhibitor in oil well production processes. The copolymers have an average molecular weight within a range of 1,000 to 20,000 Da. Wells can typically be treated with between 2 and 100 ppm of the copolymer on an active basis.

U.S. Pat. No. 5,171,459 discloses the use of a scale inhibitor comprising of a phosphate ester or phosphonate, for $CaCO_3$ inhibition combined with a alkyldiphenylether sulfonate for dispersing sulfide scales/deposits. The sulfide dispersant comprises mono- and/or disulfonated alkyldiphenylether, wherein the alkyl substituent has from 4 to 30 carbon atoms and can be branched or linear. The dispersant and inhibitor are treated with between 1 and 50 ppm each and can treat a water with the zinc and/or lead concentration up to around 200 ppm.

U.S. Pat. No. 5,332,491 describes a dispersant for iron sulfide used for the treatment of this scale in hydrocarbon streams found in refinery and petrochemical plant operations. The dispersant described comprises a free-radical copolymer of α-olefin between $C_{10}$ to $C_{36}$ and maleic anhydride. The resultant polymer has the anhydride moieties along the copolymer backbone in a substantially unhydrolyzed form.

US 2005/0067164 A1 discloses copolymer derived from a cationic monomer that inhibits and controls zinc sulfide and iron sulfide scales formed when zinc bromide brines are used as completion fluids. The copolymer in the invention contains an acrylamide unit and a diallyldimethylammonium salt thereof. The copolymers have an average molecular weight within a range of 500,000 and 5,000,000 Da. The copolymers of the invention may also be used to treat scales of calcium, barium, magnesium etc., such as barium sulfate, calcium sulfate and calcium carbonate. When treating oil wells, the copolymer as part of a carrier fluid is present in amounts between 15 and 100,000 ppm. When present in brine, the copolymer is typically between 0.02 and 2 mol-%.

US 2009/0143252 A1 discloses a monomer with a general formula (as specified within the patent) that is part of a homopolymer, where a part of the monomer ("A" within the general formula) can be a straight or branched alkyl chain ranging from 1 to 10 carbon atoms, or is a copolymer of monomers such as acrylate, acrylamide or methacrylamide to disperse metal sulfides prior to their forming scales. Terpolymers of dimethyldiallylammonium salt, 2-hydroxy-propyl acrylate and acrylic acid could also be used for this purpose. The homopolymers and copolymers in the invention have an average molecular weight within a range of 5,000 and 5,000,000 Da. The method of treating is described in the invention as being introduced into crude oil at a concentration of between 1 and 10,000 ppm.

EP-A-1041885 provides a biocidally synergistic mixture comprising THP and at least one THP-compatible, non-surfactant, biopenetrant synergist together optionally with a surfactant characterised in that the non-surfactant biopenetrant is selected from quaternary ammonium polymers and copolymers, an alkyl benzene or alkyl naphthalene sulphonate having less than 5 aliphatic atoms and/or a phosphono polycarboxylic acid.

WO-03/021031 teaches phosphonium compounds having the general formula (I)

[Y$_n$P(CH$_2$OH)$_{4-n}$]X$^-$ wherein
n is a positive integer of from 1 to 4,
X is an anion and
Y is an organic residue comprising a hydrophilic group and phosphine compounds having the general formula (II)

Y$_n$P(CH$_2$OH)$_{3-n}$ (II)

wherein
n is a positive integer of from 1 to 3 and
Y is an organic residue comprising a hydrophilic group.

A method for the production of phosphorous compounds according to the above formula (I) and formula (II) and examples of uses of these compounds, including as cross-linking agents in tanning, as biocides and as iron sulphide/scale dissolvers.

WO2013/152832 A1 describes the use of a copolymer based upon an AMPS platform, one example is given as 58% AMPS, 38% Acrylic Amide, 2% n-Vinyl Formamide, 2% Vinyl Phosphonic Acid. The invention also describes blending of the copolymer species with conventional scale inhibitors and glycol based solvents.

The object of the invention was to provide formulations which can be used for the inhibition and/or dispersion of inorganic sulfide scales. The formulations of the invention should have particular applicability in inhibiting and/or dispersing zinc sulfide, lead sulfide and iron sulfide. They should be notable for improved performance and biodegradability compared to the formulations and chemistries of the prior art.

Surprisingly, it has been found that a ternary composition that comprises a terpolymer of vinyl phosphonic acid together with two different acrylic monomers, a phosphonium salt and a surfactant will inhibit the precipitation of inorganic sulfide scales. Moreover, it will dissolve sulfide scales that have already formed.

In a first aspect, the present invention provides a composition useful as a sulfide scale inhibitor for application in oilfield operations, comprising
1.) at least one copolymer that comprises as monomers
    a) 0.1 to 10 mol-% of structural units derived from vinylphosphonic acid and/or of a salt thereof,
    b) 40 to 90 mol-% of structural units derived from compounds of the formula (1)

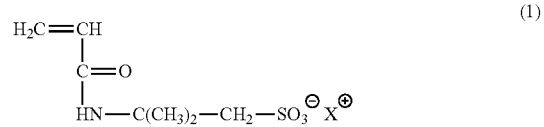

c) 1 to 50 mol-% of structural units derived from compounds of the formula (2)

in which
X is OH or NR$^3$R$^4$, and R$^3$ and R$^4$, independently of one another, are H or C$_1$-C$_4$-alkyl,
2.) at least one of tris (hydroxymethyl) phosphine and a tetrakis(hydroxymethyl)phosphonium salt,
3.) at least one surfactant,
4.) at least one amine or ammonium salt.

In a second aspect, the present invention provides the use of the composition of the first aspect as a sulfide scale inhibitor for application in oilfield operations and process systems.

In a third aspect, the present invention provides a process for inhibiting sulfide scale in oilfield operations and process systems, the process comprising adding to a system susceptible to sulfide scale formation the composition of the first aspect.

In a preferred embodiment, the composition comprises additionally at least one hydrogen sulfide scavenger as component from group 5.

In another preferred embodiment, the composition comprises additionally at least one scale inhibitor and/or at least one corrosion inhibitor as component from group 6.

In another preferred embodiment, one or more component from group 5 is present comprising components from each of groups 1, 2, 3 and 4.

In another preferred embodiment, one or more component from group 6 is present comprising components from each of groups 1, 2, 3 and 4.

In another preferred embodiment, one or more component from each of groups 5 and 6 are present comprising components from each of groups 1, 2, 3 and 4.

Group 1

The invention requires the presence of a copolymer, comprising
a) 0.1 to 10 mol-% of structural units derived from vinylphosphonic acid and/or of a salt thereof,
b) 40 to 90 mol-%, of structural units derived from compounds of the formula (1)

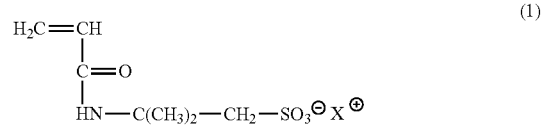

c) 1 to 50 mol-% of structural units derived from compounds of the formula (2)

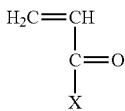
(2)

in which
X is OH or $NR^3R^4$, and $R^3$ and $R^4$, independently of one another, are H or $C_1$-$C_4$-alkyl.

Molar percentages are to be understood as relating to the total copolymer composition.

In one preferred embodiment, the copolymer comprises additionally 1 to 10 mol-%, based on the total copolymer composition, of structural units of formula (3)

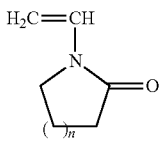
(3)

in which
n is 1, 2, 3, 4 or 5, preferably 1.

In one preferred embodiment, the copolymer comprises additionally 1 to 10 mol-%, based on the total copolymer composition, of structural units of formula (4)

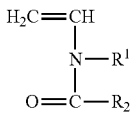
(4)

in which
$R^1$ and $R^2$, independently of one another, are hydrogen or $C_1$-$C_4$-alkyl, preferably both $R^1$ and $R^2$ are both hydrogen.

In all embodiments of the invention, monomers comprising an olefinically unsaturated hydrocarbon substituted ammonium salt group, wherein the expression hydrocarbon encompasses groups containing oxygen, are present in the copolymer in an amount of preferably below 1 mol-%, particularly 0.001 to 1 mol-%, especially 0.001 to 0.1 mol-%. They are particularly preferably completely absent.

In all embodiments of the invention, the molar proportion of vinylphosphonic acid or salts thereof is preferably from 0.8 to 6, especially from 1 to 4 mol-%. Suitable salts of vinylphosphonic acid are preferably the alkali metal or ammonium ($NH_4^+$) salts thereof.

In a preferred embodiment, the molar proportion of structural units which are derived from compounds of the formula (1) in all embodiments of the invention is preferably from 45 to 70, especially from 50 to 65 mol-%.

The molar proportion of structural units which are derived from compounds of the formula (2) is preferably from 5 to 45, especially from 10 to 40 mol-%. Formula (2) preferably represents acrylic acid and/or acrylamide. If formula (2) represents only acrylamide, the proportion thereof is preferably from 5 to 45, especially from 10 to 40 mol-%. If formula (2) represents a mixture of acrylic acid and acrylamide, the proportion of acrylic acid is preferably from 1 to 10 mol-%, especially from 2 to 5 mol-%, and the proportion of acrylamide provides for the difference up to the total molar amount as described above.

The molar proportion of structural units which are derived from compounds of the formula (4) is preferably from 1 to 10, particularly from 2 to 8, especially from 3 to 7 mol-%.

The molar proportion of structural units which are derived from compounds of the formula (3) is preferably from 1 to 10, particularly from 2 to 8, especially from 3 to 7 mol-%.

Particular examples of suitable copolymers comprise (molar %).

58% AMPS, 38% Acrylic Amide, 2% n-Vinyl Formamide, 2% Vinyl Phosphonic Acid.

68% AMPS, 28% Acrylic Amide, 2% n-Vinyl Formamide, 2% Vinyl Phosphonic Acid.

83% AMPS, 5% n-Vinyl Pyrrolidone, 5% n-Vinyl Formamide, 5% Acrylic Amide, 2% Vinyl Phosphonic Acid.

The monomer units may be in any sequence in the copolymers. They may be either random polymers or block polymers.

The molecular weights (number average) of the copolymers according to the invention are preferably from 100,000 to 10,000,000 g/mol, in particular from 500,000 to 5,000,000 g/mol. Molecular weight is to be determined by GPC against polyacrylic acid as standard.

The copolymers according to the invention can be prepared by copolymerization of vinyl phoshonic acid and compounds of the formulae (1), (2) and optionally (3), (4) in the stated molar ratios.

The copolymers according to the invention can be prepared by the conventional polymerization methods, such as solution polymerization, mass polymerization, emulsion polymerization, inverse emulsion polymerization, precipitation polymerization or gel polymerization. They are preferably the product of a free-radical copolymerization of vinyl phosphonic acid and the compounds of the formulae (1), (2) and optionally (3), (4).

Group 2

It is well known to one skilled in the art that tetrakis (hydroxmethyl) phosphonium salts (THP salts) are effective at chelating iron. Another aspect of the present invention concerns a composition comprising tris(hydroxymethyl) phosphine (TRIS).

As used herein the expression "THP" is used, when ever the context permits, to refer generally to both THP and THP salts. THPS means specifically a THP salt.

The effectiveness of THP as a solubilizing agent for iron sulfides varies considerably from situation to situation. It has been shown in the literature that this is because the complex with iron sulfide requires the presence of ammonium ions. Although ammonium ions are normally present in oilfield water, the concentration is frequently less than the optimum for iron sulfide removal. It has also been reported that pH is critical to the formation of the complex. The pH of water systems in oilfields can vary substantially.

The current invention comprises TRIS, or THP of the formula $[P(CH_2OH)_4]_qT$ where q is 1, 2 or 3 and the anion T balances the net positive charge of one or more phosphonium cations. T is typically a monoanion, dianion or trianion, i.e. has one, two or three negative charges. While any routinely accessible anion T can be used, it is preferred that T is chosen such that compounds are soluble in water, alcohols, or in mixtures thereof.

Thus, suitable monoanions include halides such as chloride, bromide, and iodide. Thus, preferred anions are selected from to chloride, bromide, iodide, lower alkyl carboxylates, bisulfite, bisulfate, hydrocarbyl sulfonates, dihydrogenphosphate, nitrate, hexafluorophosphate, sulfate, sulfite, monohydrogenphosphate, and phosphate. More preferred anions include chloride and sulfate, and preferred compounds of thus are tetrakis(hydroxymethyl)phosphonium chloride and tetrakis(hydroxymethyl)phosphonium sulfate). Also contemplated are lower alkyl carboxylates. The term "lower alkyl" refers to a straight or branched $C_1$ to $C_6$ alkyl group. Exemplary lower alkyl carboxylates are methyl carboxylate (i.e., acetate), ethyl carboxylate, and propyl and iso-propyl carboxylates.

Other monoanions include sulfur-based anions such as bisulfite, bisulfate, and hydrocarbyl sulfonates. Hydrocarbyl sulfonates are anions of the formula $R^{18}S(O)_2O^-$. $R^{18}$ is a $C_1$ to $C_{10}$ alkyl or aryl group. The expression "aryl" means an aromatic system having from 6 to 10 carbon atoms that may be substituted with one or more $C_1$ to $C_{10}$ alkyl groups. Examples of hydrocarbyl sulfonates include, but are not limited to, methylsulfonate, benzenesulfonate, paratoluenesulfonate, and the isomers of xylenesulfonate. Still other suitable monoanions include nitrate and hexafluorophosphate. Dianions include sulfate, sulfite, and monohydrogen phosphate. An acceptable trianion is phosphate. Particularly preferred compounds are tetrakis(hydroxymethyl)phosphonium sulfate (as shown in formula 5) and tetrakis(hydroxymethyl)phosphonium chloride.

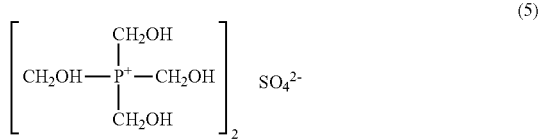

(5)

Group 3

A surfactant as defined herein is a compound that will decrease the surface tension when added to the aqueous compositions as described herein. In a comparison of the aqueous composition with and without surfactant, the aqueous composition with surfactant needs to have a lower surface tension.

In a preferred embodiment, the surfactant is a compound having an HLB value of between 11 and 16, preferably between 12 and 14. HLB values are determined most accurately using method EN 12836:2002 (Surface active agents—Determination of the water number of alkoxylated products).

The presence of a surfactant is crucial to the success of a sulfide inhibitor formulation due to the oil wetting nature of the sulfide scales themselves. In order to gain access to the mineral surface for crystal growth and nucleation modification, the accumulated oil and other organic solids have to first be removed to allow the subsequent synergistic dissolver components described in group 1 and group 2.

Surfactants for use in the present invention typically contain hydrophobic groups such as alkenyl, cycloalkenyl, alkyl, cycloalkyl, aryl, alkyl/aryl or more complex aryl (as in petroleum sulfonates) moieties being from $C_8$ to $C_{22}$, preferably $C_{10}$ to $C_{20}$, typically $C_{12}$ to $C_{18}$, and a hydrophilic moiety which preferably is a polyethoxy group with 5 to 20 ethoxy units. Other hydrophobic groups included in the invention are polysiloxane groups and polyoxypropylene groups.

The surfactant may for example comprise or consist of an at least sparingly water-soluble salt of sulfonic or monoesterified sulfuric acids, e.g. an alkylbenzene sulfonate, alkyl sulfate, alkyl ether sulfate, olefin sulfonate, alkane sulfonate, alkylphenol sulfate, alkylphenol ether sulfate, alkylethanolamide sulfate, alkylethanolamidether sulfate, or alpha sulfo fatty acid or its ester each having at least one alkyl or alkenyl group with from $C_8$ to $C_{22}$, more usually $C_{10}$ to $C_{20}$, aliphatic atoms.

The expression "ether" here-in-before refers to compounds containing one or more glyceryl groups and/or an oxyalkylene or polyoxyalkylene group especially a group containing from 1 to 150 oxyethylene and/or oxypropylene groups. One or more oxybutylene groups may additionally or alternatively be present. For example, the sulfonated or sulfated surfactant may be sodium dodecyl benzene sulfonate, potassium hexadecyl benzene sulfonate, sodium dodecyl, dimethyl benzene sulfonate, sodium lauryl sulfate, sodium tallow sulfate, potassium oleyl sulfate, ammonium lauryl sulfate, sodium tallow sulfate, potassium oleyl sulfate, ammonium lauryl monoethoxy sulfate, or monethanolamine cetyl 10 mole ethoxylate sulfate.

Other anionic surfactants useful according to the current invention include alkyl sulfosuccinates, such as sodium dihexylsulfosuccinate, alkyl ether sulfosuccinates, alkyl sulfosuccinamates, alkyl ether sulfosuccinamates, acylsarcosinates, acyl taurides, isethionates, soaps such as stearates, palmitates, resinates, oleates, linoleates and alkyl ether carboxylates.

Anionic phosphate esters and alkyl phosphonates, alkylamino and imino methylene phosphonates may be used. In each case the anionic surfactant typically contains at least one alkyl or alkenyl chain having from $C_8$ to $C_{22}$, preferably $C_{10}$ to $C_{20}$. In the case of ethers, there is one or more glyceryl group, and/or from 1 to 150 oxyethylene and/or oxypropylene and/or oxybutylene groups. Preferred anionic surfactants are sodium salts. Other salts of commercial interest include those of potassium, lithium, calcium, magnesium, ammonium, monoethanolamine, diethanolamine, triethanolamine, alkyl amines containing up to seven aliphatic carbon atoms, and alkyl and/or hydroxyl alkyl phosphonium.

The surfactant component of the present invention may optionally contain or consist of non-ionic surfactants. The non-ionic surfactant may be e.g. $C_{10}$ to $C_{22}$ alkanolamides of a mono or di-lower alkanolamine, such as coconut monethanolamide. Other non-ionic surfactants which may optionally be present, include tertiary acetylenic glycols, polyethoxylated alcohols, polyethoxylated mercaptans, glucamines and their alkoxylates, glucamides and their alkoxylates, alkylpolyglucacides, polyethoxylated carboxylic acids, polyethoxylated amines, polyethoxylated alkylolamides, polyethoxylated alkylphenols, polyethoxylated glyceryl esters, polyethoxylated sorbitan esters, polyethoxylated phosphate esters, and the propoxylate or ethoxylated and propoxylated analogues of all the aforesaid ethoxylated non-ionics, all having a $C_8$ to $C_{22}$ alkyl or alkenyl group and up to 20 ethyleneoxy and/or propyleneoxy groups. Also included are polyoxypropylene/polyethylene oxide block copolymers, polyoxybutylene/polyoxyethylene copolymers and polyoxybuylene/polyoxypropylene copolymers. The polyethoxy, polyoxypropylene and polyoxybutylene compounds may be end capped with, e.g. benzyl groups to reduce the foaming tendency.

Compositions of the present invention may contain an amphoteric surfactant. The amphoteric surfactant may for example be a betaine, e.g. a betaine of the formula $(R^5)_3N^+CH_2COO^-$, wherein each $R^5$ may be the same or different and is an alkyl, cycloalkyl, alkenyl or alkaryl group and preferably at least one, and more preferably not more than one $R^5$ has an average of from $C_8$ to $C_{20}$, e.g. $C_{10}$ to $C_{18}$ of an aliphatic nature and each other $R^5$ has an average of from $C_1$ to $C_4$.

Other amphoteric surfactants for use according to the current invention include quaternary imidazolines, alkyl amine ether sulfates, sulfobetaines and other quaternary amine or quaternised imidazoline sulfonic acids and their salts, and zwitterionic surfactants, e.g. N-alkyl taurines, carboxylates amidoamines such as $R^6CONH(CH_2)_2N''(CH_2CH_2CH_3)_2CH_2CO^-_2$ and amido acids having, in each case, hydrocarbon groups capable of conferring surfactant properties ($R^6$ is either alkyl, cycloalkyl alkenyl or alkaryl groups having from $C_8$ to $C_{20}$ of an aliphatic nature). Typical examples include 2-tallow alkyl, 1-tallow amido alkyl, 1-carboxymethyl imidazoline and 2-coconut alkyl N-carboxymethyl 2 (hydroxyalkyl) imidazoline. Generally speaking any water soluble amphoteric or zwitterionic surfactant compound which comprises a hydrophobic portion including $C_8$ to $C_{20}$ alkyl or alkenyl group and a hydrophilic portion containing an amine or quaternary ammonium group and a carboxylate, sulfate or sulfonic acid group may be used in the present invention.

Compositions of the present invention may also include cationic surfactants. The cationic surfactant may for example be a quaternary ammonium compound of the formula (6):

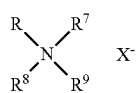

(6)

wherein
$R^7$ is a $C_5$ to $C_{21}$ aliphatic hydrocarbon group,
X is an anionic counter ion, and
R, $R^8$, $R^9$ are selected from the group consisting of hydrogen, methyl, ethyl, allyl, propyl, butyl, phenyl or benzyl residues, Typically alkylammonium surfactants for use according to the invention have one or at most two long aliphatic chains per molecule (e.g. chains having an average of $C_8$ to $C_{20}$ each, usually $C_{12}$ to $C_{18}$) and two or three short chain alkyl groups having $C_1$ to $C_4$ each, e.g. methyl or ethyl groups, preferably methyl groups. Typical examples include dodecyl trimethyl ammonium salts. Benzalkonium salts having one $C_8$ to $C_{20}$ alkyl group, two $C_1$ to $C_4$ alkyl groups and a benzyl group are also useful. Another useful class of cationic surfactant according to the present invention comprises N-alkyl pyridinium salts wherein the alkyl group has an average of from $C_8$ to $C_{22}$, preferably $C_{10}$ to $C_{20}$. Other similarly alkylated heterocyclic salts, such as N-alkyl isoquinolinium salts, may also be used. Alkylaryl dialkylammonium salts in which the alkylaryl group is an alkyl benzene group having an average of from $C_8$ to $C_{22}$, preferably $C_{10}$ to $C_{20}$ and the other two alkyl groups usually have from $C_1$ to $C_4$, e.g. methyl groups are useful. Other classes of cationic surfactant which are of use in the present invention include so called alkyl imidazoline or quaternized imidazoline salts having at least one alkyl group in the molecule with an average of from $C_8$ to $C_{22}$ preferably $C_{10}$ to $C_{20}$. Typical examples include alkyl methyl hydroxyethyl imidazolinium salts, alkyl benzyl hydroxyethyl imidazolinium salts, and 2 alkyl-1-alkylamidoethyl imidazoline salts. Another class of cationic surfactant for use according to the current invention comprises the amido amines such as those formed by reacting a fatty acid having $C_2$ to $C_{22}$ or an ester, glyceride or similar amide forming derivative thereof, with a di or poly amine, such as, for example, ethylene diamine or diethylene triamine, in such a proportion as to leave at least one free amine group. Quaternized amido amines may similarly be employed. Alkyl phosphonium and hydroxyalkyl phosphonium salts having one $C_8$ to $C_{20}$ alkyl group and three $C_1$ to $C_4$ alkyl or hydroxyalkyl groups may also be used as cationic surfactants in the present invention. Typically the cationic surfactant may be any water soluble compound having a positively ionized group, usually comprising a nitrogen atom, and either one or two alkyl groups each having an average of from $C_8$ to $C_{22}$. The anionic portion of the cationic surfactant may be any anion which confers water solubility, such as formate, acetate, lactate, tartrate, citrate, chloride, nitrate, sulfate or an alkylsulfate ion having up to $C_4$ such as a higher alkyl sulfate or organic sulfonate. Polyfluorinated anionic, nonionic or cationic surfactants may also be useful in the compositions of the present invention. Examples of such surfactants are polyfluorinated alkyl sulfates and polyfluorinated quaternary ammonium compounds.

Compositions of the current invention may contain a semi-polar surfactant such as an amine oxide e.g. an amine oxide containing one or two (preferably one) $C_8$ to $C_{22}$ alkyl group, the remaining substituent or substituents being preferably lower alkyl groups, e.g. $C_1$ to $C_4$ alkyl groups or benzyl groups. Particularly preferred for use according to the current invention are surfactants which are effective as wetting agents, typically such surfactants are effective at lowering the surface tension between water and a hydrophobic solid surface. Surfactants are preferred which do not stabilize foams to a substantial extent.

Mixtures of two or more of the foregoing surfactants may be used. In particular mixtures of non-ionic surfactants with cationic and/or amphoteric and/or semi polar surfactants or with anionic surfactants may be used. Typically mixtures of anionic and cationic surfactants are avoided, which are often less mutually compatible. The surfactants in the compositions of the current invention may be used as a bio-penetrant.

Compositions of the invention may also comprise non-surfactant bio-penetrants including any of those described in WO99/33345. The non-surfactant bio-penetrant may for example be a quaternary ammonium polymer or copolymer. The quaternary ammonium polymer may for example be any of those described in U.S. Pat. No. 4,778,813. Particularly preferred is poly [oxyethylene(dimethyliminio) ethylene (dimethyliminio)ethylene dichloride]. This is a copolymer of N,N,N',N',-tetramethyl-1,2-diamino ethane with bis(2-chloroethyl) ether, which is commonly referred to as "WSCP". The latter is the commercial name of a product which is sold by Buckman Laboratories. However, any other water soluble polymer containing a plurality of quaternary ammonium groups may be used. Some other typical examples include: Poly [hydroxyethylene(dimethyliminio)ethylene (dimethyliminio)methylene dichloride], Poly [hydroxyl-ethylene (dimethyliminio)-2 hydroxypropylene (dimethyliminio) methylene dichloride], N-[3-(dimethylammonio)propyl]-N[3-(ethyleneoxyethylenedimethylammonio) propyl] urea dichloride-4-[1-tris(2-hydroxyethyl)ammonium chloride, 2-butenyl]poly[1-dimethyl ammonium chloride-2 butenyl]tris(2-hydroxyethyl)ammonium chloride.

The non-surfactant-bio-penetrant may alternatively be a hydrotrope. Hydrotropes are sometimes confused with surfactants because they are also amphiphilic. However hydrotropes do not significantly affect surface tension at low concentrations. Hydrotropes act as solubilizers. When present in relatively high concentrations (e.g. greater than about 1 wt.-%) they increase the water solubility of sparingly or moderately soluble solutes.

A preferred class of hydrotropes includes water soluble glycol ethers. The glycol ether is preferably a water soluble compound of the formula (7)

$$HO[CR^{10}CR^{10}O]_pR^{11} \qquad (7)$$

wherein $R^{10}$ are methyl, ethyl or preferably H, provided that the total number of carbon atoms per $[CR^{10}CR^{10}O]$ group does not exceed 4, more preferably is not more than 3 and most preferably is 2.

$R^{11}$ is a $C_1$ to $C_6$ hydrocarbon group such that the compound is water soluble, e.g. butyl, propyl, ethyl or preferably methyl.

p is from 1 to 20, preferably 1 to 10, especially 1 to 5, typically 1 to 3, most preferably 2.

Preferred examples include diethylene glycol monomethyl ether or 2-butoxyethanol (ethylene glycol monobutyl ether).

An important class of hydrotropes for use according to the current invention comprises the lower alkyl aryl sulfonates. Water soluble salts, e.g. sodium, potassium, ammonium or salts of benzene sulfonic, toluene sulfonic, xylene sulfonic, ethyl benzene sulfonic or cumene sulfonic acids are very effective. Generally, alkylbenzene sulfonic acids having up to four or even five aliphatic carbon atoms show hydrotropicity but not significant surfactancy. Above six aliphatic carbons, e.g. sodium octyl benzene sulfonate, surfactancy predominates over hydrotropicity. Naphthalene sulfonates are also useful as non-surfactant bio-penetrants, e.g. alkali metal $C_1$ to $C_4$ alkyl naphthalene sulfonates. Urea is also an effective hydrotrope.

One preferred embodiment uses a surfactant including at least one N-Alkyl-N-acylglucamine

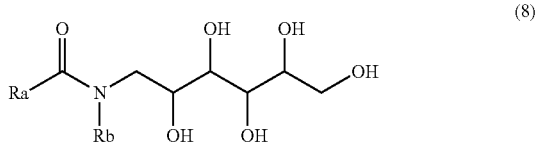

(8)

wherein

Ra is a linear or branched, saturated or unsaturated $C_5$-$C_{21}$- hydrocarbon residue, preferably a $C_7$-$C_{13}$-hydrocarbon residue, and Rb is a $C_1$-$C_4$ alkyl residue, preferably methyl.

In another preferred embodiment, the N-Alkyl-N-acylglucamines comprise at least 50 wt.-% of the total amount of N-Alkyl-N-acylglucamines (8) compounds with $C_7$-$C_9$-alkyl residue and at least 50 wt.-% of the total amount of N-Alkyl-N-acylglucamines (8) compound with $C_{11}$-$C_{13}$-alkyl residue.

In another preferred embodiment, the surfactant is including at least one cyclic N-Alkyl-N-acylglucamine of the formulae

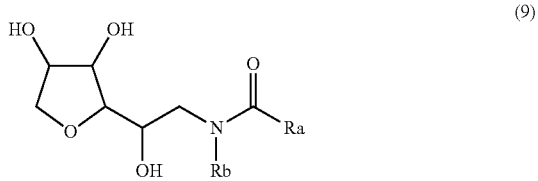

(9)

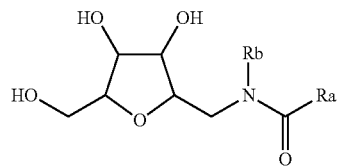

(10)

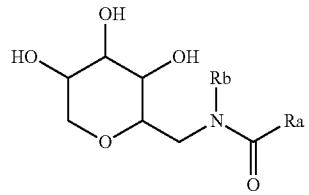

(11)

whereas in formulae (9), (10) and (11)

Ra is a linear or branched, saturated or unsaturated $C_5$-$C_{21}$- alkyl residue, preferably a $C_7$-$C_{13}$-alkyl residue, and Rb is a $C_1$-$C_4$-alkyl residue, preferably methyl.

In yet another preferred embodiment, the surfactant is nonyl phenol ethoxylate

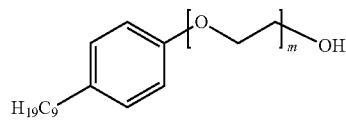

(12)

wherein m is a number from 1 to 20, preferably 6 to 15, more preferably 8 to 12.

Group 4

The addition of an amine compound is efficacious to the practice of the instant invention. The amine or its ammonium derivative, combined with the other components of the instant invention, can be selected from a variety of amines and their conjugate acids. It is preferred but not essential that if the amine or its conjugate acid is a solid, then it should be soluble in the solvent employed in the composition of this invention. Similarly, if the amine or its conjugate acid is a liquid, then it is preferably miscible with the solvent. One suitable amine is ammonia. Primary amines, such as alkylamines, are particularly high performing in the practice of this invention. Preferably, the expression "alkyl" means with respect to Group 4 a $C_1$ to $C_{22}$, more preferably a $C_1$ to $C_8$ linear or branched alkyl group.

Exemplary alkylamines comprise, but are not limited to, methylamine, ethylamine, normal- and iso-propylamines, and normal- and tert-butylamines. Other primary amines comprise alkylenediamines, such as 1,2-diaminoethane and 1,3-diaminopropane. Still other exemplary primary amines comprise cycloalkylamines, such as cyclopropylamine, cyclobutylamine, cyclopentylamine, and cyclohexylamine. Ammonium derivatives of these amines can also be used. An ammonium derivative is the conjugate acid of an amine. A conjugate acid of an amine is obtained by the formal addition of an acid to that amine. Suitable acids include inorganic acids such as HCl, HBr, HI, and phosphoric acid, and organic acids such as carboxylic acids. Thus, the present invention contemplates a variety of ammonium derivatives. Particularly preferred ammonium derivatives include ammonium chloride, ammonium nitrate, methylammonium chloride, and ethylammonium chloride.

Group 5

The addition of a hydrogen sulfide scavenger serves a two-fold purpose. Firstly it scavenges any residual $H_2S$ generated as a result Group 2 components, also comprising a surfactant from group 3 and a copolymer from Group 1, yielding generation of excess $H_2S$.

Secondly it increases the efficacy of the inhibition process by removing $H_2S$ generated from dissolution of sulfide scales and shifts the equilibrium of the reaction to promote further dissolution of sulfide scale by the components in group 1 and group 2, also comprising a surfactant from group 3.

Scavengers that can be included in the formulation include triazine compounds, described by the following formula:

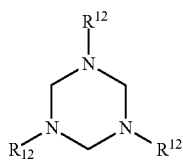
(13)

wherein
$R^{12}$ is independently selected from the group consisting of $C_1$ to $C_{20}$ straight or branched alkyl groups, or —$R^{13}OH$, where $R^{13}$ is a $C_1$ to $C_{20}$ straight or branched alkylene group. Preferably, at least one $R^{12}$ group is a $C_1$ to $C_{20}$ straight or branched alkyl group and at least one $R^{12}$ group is —$R^{13}OH$.

Further, the scavenger can be selected from a range of hemi-acetal compounds, described by the general formula $R^{14}R^{15}C(OH)OR^{16}$ wherein $R^{14}$, $R^{15}$ or $R^{16}$ are hydrogen and/or $C_1$ to $C_{20}$ straight or branched alkyl group. In a preferred embodiment, $R^{14}$, $R^{15}$, $R^{16}$ all are $C_1$ to $C_{20}$ straight or branched alkyl groups.

Further, the scavenger compound may be selected from hydantoins. Exemplary hydantoins include, but are not limited to hydroxyalkylhydantoins, bis(hydroxyalkyl)hydantoins, and dialkylhydantoins, where the alkyl group is generally a $C_1$ to $C_6$ alkyl group. Exemplary hydroxyaklyhydantoins useable as the aldehyde-releasing compound include, but are not limited to, 1-hydroxymethyl-5,5-dimethyl-hydantoin also known as monomethylol-dimethylhydantoin (MDMH), 3-hydroxymethyl-5,5-dimethyl-hydantoin. Exemplary bis (hydroxyl-alkyl) hydantoins useable as the aldehyde-releasing compound include, but are not limited to, 1,3-bis(hydroxymethyl)-5,5-dimethylhydantoin as known as dimethyloldimethylhydantoin (DMDMH). Exemplary dialkylhydantoins useable as the aldehyde-releasing compound include, but are not limited to, 5,5-dimethylhydantoin. In addition, mixtures of the hydantoins may also be used.

Glyoxal (or ethandial) is a dialdehyde that has been shown in the art to scavenge hydrogen sulfide gas (e.g. U.S. Pat. No. 4,680,127) and may also be used in the present invention to scavenge any hydrogen sulfide when contained in a formulation comprising group 1 and group 2 components, with an additional surfactant from group 3.

Zinc carboxylates, such as those described in US-2014/0190870, can also be used in combination with the current invention to provide scavenging of hydrogen sulfide resulting from dissolution of sulfide scales by the synergistic components taken from group 1 and group 2. Specific examples of suitable metal salts include, but are not limited to, zinc chloride, zinc acetate, zinc octoate, a zinc salt containing at least one hydrocarbyl group of at least 4 carbon atoms, such as zinc di-(neo-alkyl)-phosphorodithioate, zinc 2-ethylhexyl isopropyl phosphorodithioate, zinc dihydrocarbyldithiophosphates (ZDDP), zinc hydrocarbyl phosphate, zinc ethyl hexanoate (zinc 2-hexanoate), zinc naphthenates, zinc oleate, zinc carboxylate polymers (e.g. catena-2-ethylhexananto-(O,O')-tri-µ-2-ethylhexanato(O,O') dizinc (II)), copper salts, cobalt salts, manganese salts, iron salts such as iron chloride, iron carboxylates (e.g. iron oleate), iron neo-carboxylates (e.g. iron 2-ethyl hexanoate), iron naphthenates, ferrocene, molybdenum metal salts, and combinations thereof. One specific suitable example is zinc octoate. In one non-limiting embodiment, the metal salts are oil soluble, but it is expected that water soluble (aqueous soluble) metal salts will also be useful. Other transition metal salts including cobalt salts and manganese salts can also be used.

One preferred embodiment of the current invention is to use 1, 3, 5 Hexahydrotriethanol-1, 3, 5 Triazine to scavenge hydrogen sulfide gas:

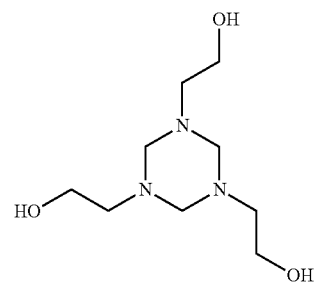
(14)

Another preferred embodiment of the current invention is to use the hemiacetal (ethylenedioxy) dimethanol (EDDM):

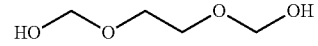
(15)

Yet another preferred embodiment of the current invention is to use 1,3-bis(hydroxymethyl)-5,5-dimethylhydantoin as known as dimethyloldimethylhydantoin (DMDMH):

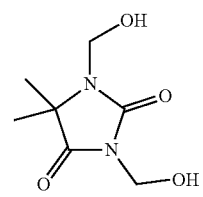
(16)

Group 6

Scale and/or corrosion inhibitors may be added to the water separately from or in association with the copolymeric compounds described in group 1 and $THP^+$ chelants of group 2 and surfactants described in group 3. The addition of these components serves to add functionality to the overall product.

Adding a scale inhibitor can prevent either the deposition of unwanted solids that may result from mixing of incompatible waters. Furthermore a batch treatment of the invention fluids entering the reservoir could serve to dissolve sulfide scale and a scale inhibitor squeeze treatment chemical could be contained within the formulation.

The corrosion inhibitor serves to reduce the overall corrosivity of the treatment, protecting the tubulars and production equipment that the dissolver is being deployed into; furthermore a batch treatment of the invention fluids entering the reservoir could serve to dissolve sulfide scales and a corrosion inhibitor squeeze chemical could be contained within the formulation.

Conventional scale inhibitors which may be added to the water to be treated in conjunction with the present invention include, but are not limited to, 1-hydroxyethane-1,1-diphosphonates, diethylenetriamine penta(methylene phosphonic acid), nitrilo(methylene phosphonic acid), methacrylic diphosphonate homopolymer, polymaleates, polyacrylates, polymethacrylates, polyphosphates, phosphate esters, acrylic acid-allyl ethanolamine diphosphonate copolymer, sodium vinyl sulfonate-acrylic acid-allyl ammonia diphosphonate terpolymer, acrylic acid-maleic acid-diethylene triamine) allyl phosphonate terpolymer and polycarboxylates, all added to the formulation so that the conventional scale inhibitor present in the water to be treated ranges from 20 to 50 mg/L.

Conventional corrosion inhibitors which may be added to the water to be treated in conjunction with the present invention include, but are not limited to soluble zinc salts, nitrates, sulfites, benzoate, tannin, lignin sulfonates, benzotriazoles and mercapto-benzothiazoles amines, imidazolines, quaternary ammonium compounds, resins and phosphate esters, all added to the formulation so that the conventional corrosion inhibitor present in the water to be treated ranges from 50 to 100 mg/L One preferred embodiment of the current invention is to use amino tris(methylene phosphonic acid) as scale inhibitor

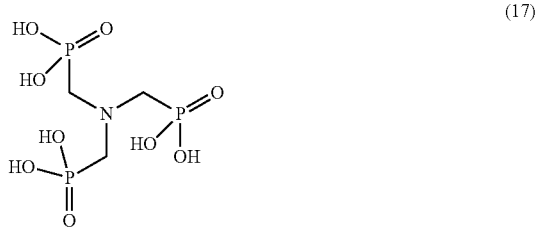 [SMILES: O=P(O)(O)CN(CP(=O)(O)O)CP(=O)(O)O]

(17)

Another preferred embodiment of the current invention is to use diethylene triamine penta(methylene phosphonic acid) (DTPMPA) as scale inhibitor

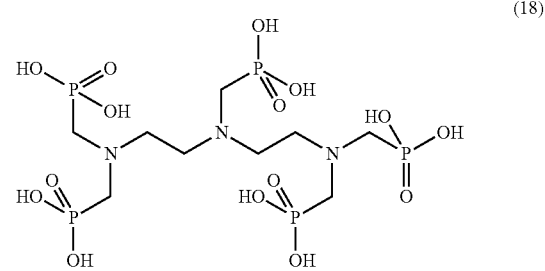 [SMILES: O=P(O)(O)CN(CCN(CP(=O)(O)O)CP(=O)(O)O)CCN(CP(=O)(O)O)CP(=O)(O)O]

(18)

Yet another preferred embodiment of the current invention is to use tallow alkyl amine ethoxylate as corrosion inhibitor

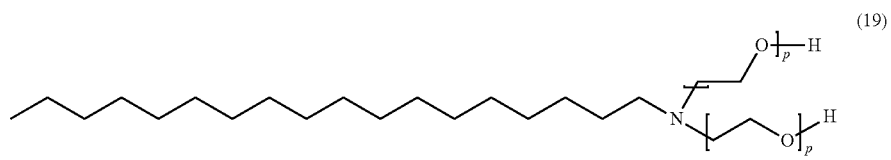

(19)

wherein
p is a number from 4 to 10.

Yet another preferred embodiment of the current invention is to use coconut alkyl dimethyl benzyl ammonium chloride as corrosion inhibitor

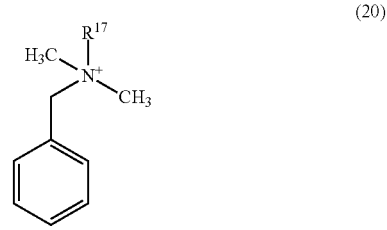

(20)

wherein
$R^{17}$ is alkyl with carbon chain length ranging from $C_8$ to $C_{18}$.

The composition may additionally contain biocides, for example, formaldehyde or glutaraldehyde, water dispersants, demulsifiers, antifoams, solvents, oxygen scavengers and/or flocculants. There may also be added to the water to be treated oxygen scavengers, flocculants such as polyacrylamide dispersants, antifoams such as acetylenic diols, silicones or polyethoxylated antifoams.

The pH of the instant invention can be between 0.5 and 8.0, but preferably is between 2.0 and 6.0, and even more preferably between 2.5 and 3.5. At higher pH's it is possible to cause degradation of several of the species in the instant invention, most notably the components comprising Group 2. Lower pH is less desirable because once in contact with sulfide scale minerals, it is possible to yield $H_2S$ if a high enough concentration of the instant invention can come into contact with the sulfide mineral. This low pH reaction can simply be described by:

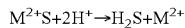

The composition of one embodiment of the present invention is preferably prepared by combining:
0.1 to 10 wt.-% of the copolymer species described above in group 1, preferably between 1 and 5 wt.-%,
1 to 50 wt.-% of the $THP^+$ species described above in group 2, preferably between 5 and 25 wt.-%,
5 to 30 wt.-% of at least one surfactant species described above in group 3, preferably between 5 and 15 wt.-%,
1 to 20 wt.-% of the scavenger species described above in Group 5, preferably between 5 and 15 wt.-%, and
1 to 20 wt.-% of the scale and/or corrosion inhibitor species described above in Group 6, preferably between 5 and 10 wt.-%.

Furthermore, any balance remaining after addition of the 5 components described above is typically made up with, but not limited to, water and/or glycol and/or alcohol based solvents. The alcohols and solvents are preferably selected from, but not limited to, methanol, ethanol, propan-1-ol, propan-2-ol, monoethylene glycol, triethylene glycol, propylene glycol and/or 2-butoxyethanol.

The inventive composition is preferably applied a production system upstream of the point of scale formation in concentrations between 0.1 and 10,000 mg/L. The exact concentration will depend on the formulation activity itself, the type of sulfide scale, static conditions, materials of construction of the medium being treated, quality of the water being used to make up the inventive solution, temperature of the system and length of time required for dissolution. At this concentration range, the inventive system can provide substantial inhibition of the sulfide scale in order to maintain the flowability of hydrocarbon production.

The present invention also includes a process for applications using the compositions above for application to be deployed in inhibition of sulfide scales in drilling and the production cycle, particularly as a component of well work-over, well intervention, production enhancement and flow assurance packages.

The injection fluid containing the instant invention may additionally contain, other ingredients known to those familiar with the art, including, but not restricted to, acids, dispersants, viscosifiers, lubricity agents, scale inhibitors, friction reducers, crosslinker, surfactants, scavenger, pH adjuster, iron control agents, breakers; this is especially true if any produced water (or recycled water) is used to perform the treatment.

Employing the embodiments of the instant invention improves the inhibition of sulfide scales while not corroding the oilfield equipment fouled with sulfide scale, nor yielding high concentrations of hydrogen sulfide gas, and working at very high kinetics. Other applications of the embodiments of the instantaneous invention include treating water for downhole injection for pressure support, treatment of drilling and work-over operations, wettability alteration and well cleanout.

EXAMPLES

The different embodiments were injected into a test well in a mature oilfield located in the United States of America, where production began at the turn of the 20th Century. Historically, the water injection system has been challenged with the deposition of iron sulfide scale. The historical treatment of the water injection system has not been dwelt on, but over the past 10 years many strategies as taught in the prior art had been employed, either in isolation or in a combination approach:
Corrosion inhibitor
Non-specific iron chelation (organic acids)
Specific iron chelation (THPS-based)
Oxidizers ($H_2O_2$, NaOCl)
Surfactants
Acrolein
Biocides
Other specialty products (of a proprietary nature)

The purpose of the field trial was also to evaluate benchmark products, as taught in the patent literature as well as the formulations of the current instant invention.

A sidestream device was used to monitor performance and metered flow through the sidestream enabled accurate injection of the test chemicals and the formulations of the instant invention. The main monitoring device was a 2-electrode Linear Polarization Resistivity (LPR) probe located at the center of the sidestream. This device was constructed after validation of the method in the laboratory, where electrode bridging was studied in a sour environment while adding aliquots of $Fe^{2+}$ to the system in order to determine the bridging effect. There is a direct proportional relationship to iron sulfide scale thickness on the electrodes and the electrical signal between the electrodes. This holds true up to a certain maximum thickness, where the electrodes become completely bridged and LPR measurements go off the scale and no longer show increases in scale thickness as they are completely bridged and essentially short-circuited.

In the field, the LPR device measured the resistivity between two electrodes and as iron sulfide formed on the metallic electrodes (metallurgy so chosen to match the pipework metallurgy) an increase in conductivity was measured (translated into an increase in "corrosion rate" by the software) and therefore his was an online, inline and real-time method of determining iron sulfide build-up. It is important to point out that this has nothing to do with corrosion; rather it should be thought of as a purely electrical signal that is directly proportional to thickness of iron sulfide deposited on the electrodes.

Secondary (off-line) measurements were made through removal of the hex-nipples, strategically located in the sidestream both upstream and downstream of the LPR probe, as well as by removal of the LPR probe itself and examination of the build up on the surfaces.

This combination approach represented a best-in-class method for determining very quickly and accurately the onset and subsequent propagation of iron sulfide build-up directly onto a surface. Subsequent analysis of the iron sulfide on the electrode and nipple surface included use of wet chemistry and analytical measurements, scanning electron microscopy (SEM), and energy dispersive x-ray analysis (EDX).

The trial began with a blank (no-chemical) test and concluded with the fully optimized instant invention formulation. The schedule of tests can be seen in Table 1.

TABLE 1

Schedule of injection trials performed during the iron sulfide trial

| Example | Injected composition | Comments |
|---|---|---|
| 1 (C) | Blank (no chemical) | To establish a baseline |
| 2 (C) | THPS Formulation | High concentration THPS based chelant |

TABLE 1-continued

Schedule of injection trials performed during the iron sulfide trial

| Example | Injected composition | Comments |
|---|---|---|
| 3 (C) | Copolymer Formulation 1 | First injection trial |
| 4 (C) | Copolymer Formulation 1 | Confirmation injection trial |
| 5 (C) | Copolymer Formulation 1 | Extended confirmation trial |
| 6 (C) | Organic acid chelant | Organic acid based chelant blend with surfactant |
| 7 | Instant invention Copolymer Formulation 2 | |

The progression of the trial was to first establish a blank baseline rate in Comparative Example 1 with no chemical being injected.

The next stage was to establish a treated baseline with one of the most field proven chemical control methods for iron sulfide, THPS, which is a well known and publicized iron specific chelating agent with surfactant-like properties. A commercially available THPS formulation was chosen based upon extensive (and successful) field application. The injected product contained 60 wt.-% THPS, 10 wt.-% $NH_4Cl$ and 30% water, THPS being in a solution that was 75 wt.-% active.

After the establishment of the THPS baseline, copolymer containing formulations as taught in WO2013/152832 were used in Comparative Example 3, 4 and 5. This formulation was 7.5 wt.-% of a copolymer (58 molar % AMPS, 38 molar % Acrylic amide, 2 molar % n-vinyl formamide, 2 molar % vinyl phosphonic acid), 30 wt.-% Diethylene Triamine Penta (Methylene Phosphonic Acid) and the balance of the formulation was water.

This initially underwent 3 stages of injection in order to understand the baseline injection rate required for control.

After the initial 3 trials of Copolymer Formulation 1, injection of an organic acid chelant was performed in order to again establish a secondary, mid-trial, baseline as Comparative Example 6. This organic acid was a blend of an ethoxylated alcohols (10 wt.-%), citric acid (20 wt.-%), glycolic acid (10 wt.-%), acetic acid (20 wt.-%) and water (40 wt.-%). After termination of the organic acid chelant, injection of a composition according to the instant invention was performed. A different baseline was established to comparative example 2 in order to validate the test methodology further against known and established benchmarks.

Example 7 is the application of the instant invention and the formulation comprised 7.5 wt.-% of a copolymer preferred embodiment from Group 1 (specifically 58 molar % AMPS, 38 molar % Acrylic amide, 2 molar % n-vinyl formamide, 2 molar % vinyl phosphonic acid), 30 wt.-% THPS (from Group 2), 5 wt.-% $NH_4Cl$, 10 wt.-% DMDMH, 10 wt.-% Diethylene Triamine Penta (Methylene Phosphonic Acid), 10 wt.-% of nonylphenol −9 EO and the balance of the formulation was water. DTPMPA was used in form of a 50 wt.-% active solution. DMDMH was used in form of a 70 wt.-% active solution. The composition of the formulations used is shown in Table 2.

TABLE 2

| Example | Polymer [wt.-%] | THPS [wt.-%] | $NH_4Cl$ [wt.-%] | DMDMH [wt.-%] | DTPMPA [wt.-%] | surfactant [wt.-%] | organic acid [wt.-%] |
|---|---|---|---|---|---|---|---|
| 1 (C) | — | — | — | — | — | 0 | 0 |
| 2 (C) | — | 60 | 10 | — | — | 0 | 0 |
| 3 (C) | 7.5 | — | — | — | 30 | 0 | 0 |
| 4 (C) | 7.5 | — | — | — | 30 | 10 | 0 |
| 5 (C) | 7.5 | 30 | 5 | — | 30 | 0 | 0 |
| 6 (C) | — | 0 | 0 | — | — | 10 | 50 |
| 7 | 7.5 | 30 | 5 | 10 | 10 | 10 | 0 | balance water

Results have been summarized in Table 3. It can clearly be seen in the blank test with no chemical that there is a build up of iron sulfide (proven later with associated analytical data) that caused bridging of the electrodes and a very high 'corrosion rate'. A final corrosion rate of 19.8 mpy after 2 weeks, with a steady build up during that time, represents a thick and pervasive layer of iron sulfide on the electrodes.

TABLE 3

The organic versus inorganic make up can be seen to be dominated by iron sulfide

| Example | Injection Rate [ppm] | Polymer [ppm] | THPS [ppm] | $NH_4Cl$ [ppm] | DMDMH [ppm] | DTPMPA [ppm] | surfactant [ppm] | organic acid [ppm] | Time [days] | corrosion rate [mpy] |
|---|---|---|---|---|---|---|---|---|---|---|
| 1 (C) | N/A | 0 | 0 | 0 | 0 | 0 | 0 | 0 | 14 | 19.8 |
| 2 (C) | 24 | 0 | 10.8 | 2.4 | 0 | 0 | 0 | 0 | 4 | 0.1 |
|  | 19 | 0 | 8.55 | 1.9 | 0 | 0 | 0 | 0 | 3 | 1.5 |
|  | 28 | 0 | 12.6 | 2.8 | 0 | 0 | 0 | 0 | 2 | 1.8 |
|  | 33 | 0 | 14.85 | 3.3 | 0 | 0 | 0 | 0 | 2 | 2.0 |
|  | 47 | 0 | 21.6 | 4.7 | 0 | 0 | 0 | 0 | 3 | 2.0 |
| 3 (C) | 1.5 | 1.5 | 0 | 0 | 0 | 6 | 0 | 0 | 3 | 5.0 |
|  | 3.0 | 3.0 | 0 | 0 | 0 | 6 | 0 | 0 | 3 | 10.0 |
| 4 (C) | 7.5 | 7.5 | 0 | 0 | 0 | 15 | 0.75 | 0 | 3 | 2.0 |
|  | 5.25 | 5.25 | 0 | 0 | 0 | 10.5 | 0.525 | 0 | 3 | 6.0 |
|  | 1.5 | 1.5 | 0 | 0 | 0 | 3 | 0.15 | 0 | 2 | 22.0 |

TABLE 3-continued

The organic versus inorganic make up can be seen to be dominated by iron sulfide

| Example | Injection Rate [ppm] | Polymer [ppm] | THPS [ppm] | NH4Cl [ppm] | DMDMH [ppm] | DTPMPA [ppm] | surfactant [ppm] | organic acid [ppm] | Time [days] | corrosion rate [mpy] |
|---|---|---|---|---|---|---|---|---|---|---|
| 5 (C) | 1.5 | 1.5 | 0 | 0 | 0 | 3 | 0 | 0 | 12 | 26.0 |
| 6 (C) | 100 | 0 | 0 | 0 | 0 | 0 | 10 | 50 | 0 | 12.0 |
| 7 | 1.5 | 1.5 | 4.5 | 1 | 1.4 | 1 | 0.15 | 0 | 6 | 0.0 |
|  | 0.75 | 0.75 | 2.25 | 0.5 | 0.7 | 0.5 | 0.075 | 0 | 5 | 0.1 |
|  | 0.6 | 0.6 | 1.8 | 0.4 | 0.56 | 0.4 | 0.06 | 0 | 2 | 0.8 |
|  | 0.45 | 0.45 | 1.35 | 0.3 | 0.42 | 0.3 | 0.045 | 0 | 1 | 2.2 |

In Table 3, the example numbers refer to the example numbers of Table 2. During injection of the previously described THPS formulation 2 (C), when compared to the blank test, there is a significant decrease in the deposition of conductive iron sulfide solids on the surface of the electrodes. Injection began at 24 ppm of chemical, and it can be seen that the build up was prevented for 4 days with a minimal increase in corrosion rate. Injection was continued at 19 ppm without cleaning the electrodes. Once injection was decreased to 19 ppm; however, the onset of deposition occurred on the electrode surfaces. As THPS is an iron specific chelant, it was necessary to then increase the rate of injection to determine the dose rate required to keep a pre-fouled surface clean. It can be seen that increasing the THPS-based formulation injection stepwise to 28 and then 33 ppm did not result in a significant step change in the increase of the deposition build up rate. Upon increasing the THPS-based formulation injection rate to 47 ppm, additional control of deposition was once again established. Therefore, it can be concluded that a pre-fouled system required 47 ppm to be kept from further deposition. In between the changes of injection rate, the electrodes remained as they were and have not been cleaned.

The previously described Copolymer Formulation 1, was injected in three separate portions of the overall trial, so examples 3 (C), 4 (C) and 5 (C). In between the two different injection rates of comparative example 3, the electrodes have not been cleaned or replaced. The same is true for the three different injection rates of comparative example 4. Electrodes have been replaced, however, inbetween comparative examples 3, 4 and 5. Each set of injections started with fresh electrodes. The formulation of the chemical product comprised the active polymer and an additional synergistic scale inhibitor component as taught in WO2013/152832. Following the different injection rates, it can be seen that the purpose of this portion of the trial was to establish a baseline with the prior art formulated polymer and to establish if the polymer alone could control iron sulfide precipitation. In short, the trends show that the polymer alone could not control the iron sulfide. In fact, it is concluded from the LPR data that the active polymer alone did very little to control the deposition of iron sulfide in the field despite simulated tests in the laboratory, as shown in the prior art, giving a high degree of performance in the laboratory. It became very clear that laboratory results were not being replicated in the field due to the fact the laboratory tests were conducted in a purely aqueous media. Furthermore, the formulation taught in WO2013/152832 is sub-optimal.

The organic acid chelant gave a mid-trial baseline, example 6 (C), as well as test another benchmark chemical that is commonly used in the industry for the control (chelation) of iron. The LPR trend for the constant 100 ppm injection of the organic acid blend can be seen to rise in a similar manner to that of the blank and it can be concluded that there was almost no effect on the prevention of iron sulfide scale build up on the electrodes. A uniform build up rate was present throughout this portion of the trial.

Copolymer formulation 2, or example 7, injection comprised a formulation of the instant invention. The efficacy of the instant invention copolymer formulation 2 increased orders of magnitude and outperformed anything else tested during this 4 month long trial. Finally the active chemical used can also be analyzed against the concentration required of stoichiometric-based 'inhibitors' such as THPS. It can be seen that 1.5 ppm active polymer in the instant invention formulation controlled the build-up of sulfide scale. Decreasing the injection rate to 0.75 ppm active polymer formulation still effectively controlled deposition. However, decreasing further to 0.6 ppm saw an increase in the apparent corrosion rate and therefore sulfide scale build-up was observed. Decreasing further served to see an increase in the rate of scale deposition. Again, inbetween the injection rates there was no cleaning or replacement of electrodes.

SEM-EDX was used to analyze the electrodes after removal. The solids were isolated and the organic content, water soluble scale, carbonate scale and iron sulfide scale determined using wet chemistry techniques. These results are shown in Table 4. It can be seen that the more efficient the control agent, the less the overall mass of deposit on the electrodes and also the less iron sulfide content of the deposit removed from the electrode and the greater the organic content. The instant invention Example 7 outperformed all other formulations in terms of active dose rate with only the THPS formulation performing to the same extent, albeit at a much higher applied rate. The organic content can be defined as the toluene soluble components of the deposits on the electrodes. The water soluble scale can be defined as the components of the deposit removed by water washing post-toluene washing. It is in fact likely that these small water soluble deposits are residual from the drying of the sample after removal from the saline produced water handling system of the field trial.

TABLE 4

The organic versus inorganic make up can be seen to be dominated by iron sulfide

| Example | Trial stage | Mass of Deposit (g) | Organic Content [%] | Water Soluble Scale [%] | Carbonate Scale [%] | Iron Sulfide [%] |
|---|---|---|---|---|---|---|
| 1 (C) | Blank | 3.671 | 22 | 1 | 3 | 74 |
| 2 (C) | THPS Formulation | 0.531 | 93 | 2 | 1 | 4 |
| 3 (C) | Copolymer 1 ($1^{st}$) | 3.963 | 51 | 2 | 0 | 47 |
| 4 (C) | Copolymer 1 ($2^{nd}$) | 3.216 | 46 | 3 | 1 | 50 |
| 5 (C) | Copolymer 1 ($3^{rd}$) | 4.025 | 42 | 2 | 1 | 55 |
| 6 (C) | Organic Acid Chelant | 3.867 | 21 | 1 | 0 | 78 |
| 7 | Instant invention Copolymer Formulation 2 | 0.310 | 96 | 1 | 1 | 2 |

The invention claimed is:

1. A composition for inhibiting sulfide scale in oilfield operations, comprising
   1) at least one copolymer that comprises as monomers
      a) 0.1 to 10 mol-% of structural units derived from vinylphosphonic acid and/or of a salt thereof,
      b) 40 to 90 mol-% of structural units derived from compounds of the formula (1)

$$H_2C=CH-C(=O)-HN-C(CH_3)_2-CH_2-SO_3^{\ominus} X^{\oplus} \quad (1)$$

c) 1 to 50 mol-% of structural units derived from compounds of the formula (2)

$$H_2C=CH-C(=O)-X \quad (2)$$

in which
X is OH or NR3R4, and R3 and R4, independently of one another, are H or $C_1$-$C_4$-alkyl,
   2) at least one of tris (hydroxymethyl) phosphine or a tetrakis(hydroxymethyl)-phosphonium salt,
   3) at least one surfactant, and
   4) at least one amine or ammonium salt,
      wherein the number average molecular weight of the at least one copolymer is from 100,000 to 10,000,000 g/mol, as determined by GPC against polyacrylic acid as the standard.

2. The composition according to claim 1, further comprising at least one hydrogen sulfide scavenger as component 5).

3. The composition according to claim 2, wherein the hydrogen sulfide scavenger is selected from the group consisting of a) triazine compounds of the formula (13):

(13)

[structure with N-$R^{12}$ groups on triazine ring]

wherein
$R^{12}$ is independently selected from the group consisting of $C_1$ to $C_{20}$ straight alkyl groups, branched alkyl groups, and —$R^{13}$OH, where $R^{13}$ is a $C_1$ to $C_{20}$ straight or branched alkylene group, b) hemi-acetal compounds of the formula
$$R^{14}R^{15}C(OH)OR^{16} \quad (13a)$$
wherein
$R^{14}$, $R^{15}$ or $R^{16}$ are hydrogen or $C_1$ to $C_{20}$ straight or branched alkyl groups, c) hydantoins,
d) glyoxal, and
e) zinc carboxylates.

4. The composition according to claim 3, wherein the scavenger is selected from the group consisting of 1, 3, 5 Hexahydrotriethanol-1, 3, 5 Triazine (14)

[triazine structure with hydroxyethyl substituents]

(ethylenedioxy) dimethanol (EDDM)

(15)

$$HO\diagup O\diagdown\diagup O\diagdown OH$$

and
and dimethyloldimethylhydantoin (DMDMH)

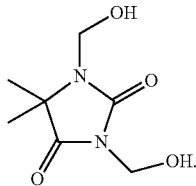 (16)

5. The composition according to claim 3, wherein the amount of the hydrogen sulfide scavenger is from 1 to 20 wt.-%.

6. The composition according to claim 1, further comprising at least one scale inhibitor and/or at least one corrosion inhibitor as component 6).

7. The composition according to claim 1, wherein the copolymer further comprises 1 to 10 mol-%, based on the total copolymer composition, of structural units of formula (3)

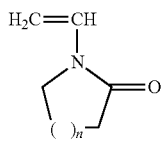 (3)

in which
n is 1, 2, 3, 4 or 5.

8. The composition according to claim 7, wherein the copolymer comprises from 1 to 10 mol-% of the structural units of formula (3).

9. The composition according to claim 1, wherein the copolymer further comprises 1 to 10 mol-%, based on the total copolymer composition, of structural units of formula (4)

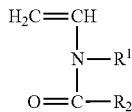 (4)

in which
$R^1$ and $R_2$, independently of one another, are hydrogen or $C_1$-$C_4$-alkyl.

10. The composition according to claim 9, wherein the copolymer comprises 1 to 10 mol-% of the structural units of formula (4).

11. The composition according to claim 1, wherein the copolymer comprises less than 1 mol-% of monomers comprising an olefinically unsaturated hydrocarbon substituted ammonium salt group.

12. The composition according to claim 1, wherein the copolymer comprises from 0.8 to 6 mol-% structural units of vinylphosphonic acid.

13. The composition according to claim 1, wherein the copolymer comprises from 45 to 70 mol-% of structural units according to formula (1).

14. The composition according to claim 1, wherein the copolymer comprises from 5 to 45 mol-% of structural units of the formula (2).

15. The composition according to claim 1, wherein formula (2) represents acrylic acid and/or acrylamide.

16. The composition according to claim 1, wherein formula (2) represents both acrylic acid and acrylamide, and wherein the proportion of acrylic acid is from 1 to 10 mol-% and the proportion of acrylamide is from 4 to 35 mol-%.

17. The composition according to claim 1, wherein the molecular weights (number average) of the copolymers are from 200,000 to 10,000,000 g/mol, as determined by GPC against polyacrylic acid as standard.

18. The composition according to claim 1, wherein a tetrakis(hydroxymethyl)phosphonium salt is used.

19. The composition according to claim 1, wherein the surfactant contains an aliphatic or an aromatic residue having 8 to 22 carbon atoms, and 5 to 20 ethoxy groups.

20. The composition according to claim 19, wherein the surfactant is an ethoxylated aliphatic alcohol, an ethoxylated aromatic alcohol or an ethoxylated amine.

21. The composition according to claim 1, wherein the surfactant is an anionic surfactant selected from the group consisting of sulfosuccinates, phosphate esters, and alkyl ether sulfonates.

22. The composition according to claim 1, wherein the surfactant is a cationic surfactant selected from the group consisting of quaternary alkylammonium compounds.

23. The composition according to claim 1, wherein the surfactant is an amphoteric surfactant selected from the group consisting of betaines and sultaines.

24. The composition according to claim 1, wherein the surfactant is a N-Alkyl-N-acylglucamine of the formula (8)

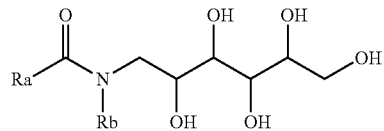 (8)

wherein
Ra is a linear or branched, saturated or unsaturated $C_5$-$C_{21}$-hydrocarbon residue, and
Rb is a $C_1$-$C_4$ alkyl residue.

25. The composition according to claim 1, further comprising a hydrotrope selected from the group consisting of
a) water soluble glycol ethers of the formula (7)

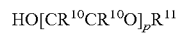 (7)

wherein
$R^{10}$ are methyl, ethyl or preferably H, provided that the total number of carbon atoms per $[CR^{10}CR^{10}O]$ group does not exceed 4,
$R^{11}$ is a lower hydrocarbon group such that the compound is water soluble,
p is from 1 to 20,
b) alkyl aryl sulfonates with $C_1$ to $C_4$ alkyl and $C_6$ to $C_{10}$ aryl groups, and
c) urea.

26. The composition according to claim 1, further comprising a scale inhibitor selected from the group consisting of 1-hydroxyethane-1,1-diphosphonates, diethylenetriamine penta(methylene phosphonic acid), nitrilo(methylene phosphonic acid), methacrylic diphosphonate homopolymer, polymaleates, polyacrylates, polymethacrylates, polyphosphates, phosphate esters, acrylic acid-allyl ethanolamine diphosphonate copolymer, sodium vinyl sulfonate-acrylic acid-allyl ammonia diphosphonate terpolymer, acrylic acid-maleic acid-diethylene triamine) allyl phosphonate terpolymer and polycarboxylates.

27. The composition according to claim 26, wherein the scale inhibitor is

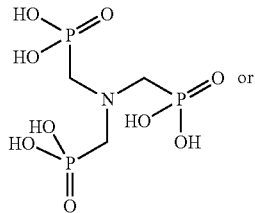
(17)

or

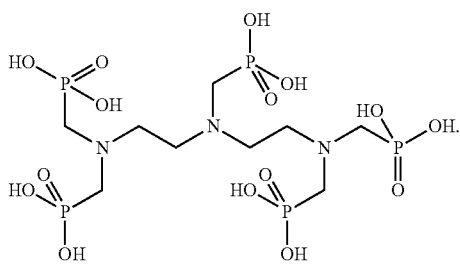
(18)

28. The composition according to claim 13, wherein the amount of the scale inhibitor is from 1 to 20 wt.-%.

29. The composition according to claim 1, further comprising a corrosion inhibitor selected from the group consisting of soluble zinc salts, nitrates, sulfites, benzoate, tannin, lignin sulfonates, benzotriazoles and mercapto-benzothiazoles amines, imidazolines, quaternary ammonium compounds, resins and phosphate esters.

30. The composition according to claim 29, wherein the corrosion inhibitor is

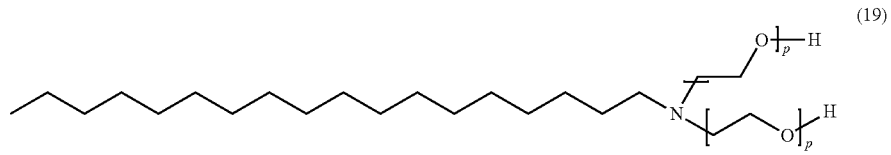
(19)

wherein
p is a number from 4 to 10,
or

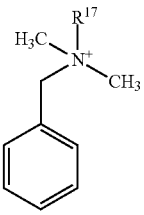
(20)

wherein
$R^{17}$ is $C_8$ to $C_{18}$ alkyl.

31. The composition according to claim 29, wherein the amount of the corrosion inhibitor is from 1 to 20 wt.-%.

32. The composition according to claim 1, wherein the amount of the copolymer is from 0.1 to 10 wt.-%.

33. The composition according to claim 1, wherein the amount of the at least one of tris (hydroxymethyl) phosphine or a tetrakis (hydroxymethyl)-phosphonium salt is from 1 to 50 wt.-%.

34. The composition according to claim 1, wherein the amount of the surfactant is from 5 to 30 wt.-%.

35. The composition according to claim 1, wherein the surfactant has an HLB value of 11 to 16.

36. The composition according to claim 1, wherein the amine or the ammonium salt is an alkyl amine or an alkyl ammonium salt having at least one $C_1$ to $C_{22}$ alkyl group.

37. The composition according to claim 1, wherein the amine is $NH_3$ and the ammonium salt is a salt of $NH_4^+$.

38. A process for inhibiting sulfide scale in an oilfield operation and/or an oilfield process system, the process comprising the step of adding the composition according to claim 1, to the oilfield operation or oilfield process system.

39. The process according to claim 38, wherein the sulfide scale is dissolved from a metal surface which is in contact with fluids produced from oil and gas wells.

* * * * *